United States Patent Office 2,816,878
Patented Dec. 17, 1957

2,816,878

COMPOSITIONS OF MATTER AND METHODS AND STEPS OF MAKING AND USING THE SAME

Mortimer T. Harvey, South Orange, and Peter L. Rosamilia, Newark, N. J., assignors to Harvel Research Corporation, a corporation of New Jersey No Drawing. Original application February 17, 1951, Serial No. 211,576. Divided and this application June 9, 1954, Serial No. 435,621

3 Claims. (Cl. 260—45.5)

The present invention relates to the treatment and to the treatment products of residues obtained by the furfural extractive distillation method for purification of butadiene which residues are considered to be for the most part due to a reaction of butadiene with furfuraldehyde. From these residues a compound has been isolated and shown to be 2,3,4,5-bis ($\Delta^2$-butenylene)-tetrahydrofurfural. A report on the subject has been made by Swadesh, Leslie and Dunlap in "Industrial and Engineering Chemistry," vol. 40, pp. 2216 to 2220, November 1948, to which report reference is hereby made.

The present invention relates more particularly to reaction products of said residues by (1) treatment with heat and katenoid condensing or polymerizing agents and (2) reactions with other compounds. And the present invention further relates to methods and steps of obtaining the products of the present invention and to physical combinations of the products of the present invention with other materials.

Illustrative examples of the methods and products of the present invention are given below, all parts being given by weight unless otherwise indicated.

Examples of agents used in the practice of the present invention for the treatment of the starting materials and herein called katenoid condensing agents are sulphuric acid, monoalkyl sulphates, dialkyl sulphates, e. g. monomethyl, monoethyl, monopropyl sulphates and higher monoalkyl sulphates and dialkyl sulphates, e. g. dimethyl, diethyl, dipropyl sulphates and higher dialkyl sulphates, also other known equipment hydrocarbon sulphates, hydrochloric acid and phosphoric acid and hydrocarbon equivalents of these and other known equivalents including maleic acid which also can be used as a condensing agent but in this case the maleic acid itself may enter into the reaction to form part of the condensation product.

We have found that the residues that are used as starting materials in the practice of the present invention have the following reaction properties and give the following treatment products.

The properties of the residue starting materials are as follows for residue from Phillips Petroleum Company's plant at Bartesville, Oklahoma:

Although the residue starting materials contain several products, for some purposes it is considered to have a molecular weight of 192 which is the molecular weight of di-butadiene monofurfuraldehyde copolymer.

Moisture (Run by benxol method) _____ 16%
Volatiles: 300 grams heated to 125° C. gives a
  loss of 50 grams or _____ 16⅔%
Iodine No. _____ 219 Wijs
Ash _____ 0.07%
Viscosity: 300 grams of the residue starting materials which has been dehydrated dissolved with 50 grams of toluene at 25° C. has a viscosity of _____ 1500 cps.

Polymerizations: 100 grams of residue starting materials which have been heated at 125° C. to remove volatiles to the amount of about 16⅔% (hereinafter called residue less volatiles) and 3 grams of diethyl sulphate were heated to 150° C. for 16 hours and the product is a hard infusible resin with the following characteristics:

Acetone extract _____ 25%
Volatility of 5 gram pulverized sample
  heated to 260° C. for 2 hrs. _____ 15% loss
Volatility of 5 gram pulverized sample
  heated to 370° C. for 2 hrs. _____ 50% loss In the examples below the residue starting materials are treated in terms as though these materials were all di-butadienemonofurfural copolymers but this is merely for use as an arbitrary guide for manufacturing purposes.

*Example A*

200 parts (16% water) residue starting material, 100 parts acetone, 1 part NaOH and 3 parts water were refluxed for one-half hour. The yield of dehydrated product was 190 grams, the product hereinafter being known as product A. The reaction was exothermic and this together with an increase in yield over a theoretical yield tends to indicate the presence of an aldehyde.

*Example B*

100 parts of residue starting material which has been heated to 125° C. to remove water and other volatiles and 10 parts of "VYNS" (a copolymer of about 90% vinyl chloride and 10% vinyl acetate) were heated to 150° C. giving a soft rubbery gel-like product hereinafter known as product B and having a high V. M. and P. naphtha and toluol resistance.

*Example C*

100 parts of product A and 10 parts "VYNS" (a copolymer of about 90% vinyl chloride and 10% vinyl acetate) were heated to 150° C. giving a soft rubbery gel-like product hereinafter known as product C and having a high V. M. and P. naphtha and toluol resistance.

*Example D*

100 parts of residue starting material which has been heated to 125° C. to remove water and other volatiles, 1 part NaOH in 3 parts of water and 10 parts of sulfur were heated to 150° C. Then there was added thereto 10 parts "VYNS" (copolymer of about 90% vinyl chloride and 10% vinyl acetate) to give a hard product hereinafter known as product D.

The following examples are given merely as illustrations of reactions with katenoid condensing agents or catalysts, such as acid and alkaline catalysts.

*Example E*

100 parts of residue starting material which has been heated to 125° C. to remove water and other volatiles, and 3 parts of diethyl sulphate were heated to from 100° C. to about 125° C. until a brittle grindable but still fusible mass is obtained and is known hereinafter as product E.

*Example F*

100 parts of dehydrated residue starting material as in Example B, 3 parts of diethyl sulfate and 2 parts of paraformaldehyde were heated carefully to about 100° C. to about 125° C. to obtain a brittle but still fusible mass hereinafter known as product F. This product F has a lower volatility at 260° C. and a lower content of solvent extractable material than product E, using toluene or V. M. and P. naphtha as the solvent.

Example G 100 parts of dehydrated residue starting material as in Example B and 10 parts of maleic acid (anhydride) were heated carefully to about 100° C. to about 125° C. to obtain a brittle but still fusible mass hereinafter known as product G.

Example H 100 parts of residue starting material which has been dehydrated by heating to 125° C. is heated with 10 parts of maleic anhydride at temperatures upward from about 100° C.–120° C. until there is obtained a brittle fusible mass, which can be ground into a powder and used in the same manner as Example E above. This product is known hereinafter as product H. The addition of hexamethylene tetramine or hexamethylene tetramine-lime speeds up the cure considerably to give heat hardness which is an advantage in quick molding.

Example I 100 parts of the residue starting material as used in Example B above and 3 parts of diethyl sulphate are heated to from about 100° C. to about 125° C. to obtain a thickened liquid or viscous mass. This product, known hereinafter as product I intermediate, can be further heated alone or with an aldehyde product such as paraformaldehyde (about 5 parts) to reach further stages of thickening and can be finally set to a infusible body. This product can be used for impregnating fabrics or for making laminations of wood, paper, fabrics or other products. The product also can be used alone or with rubber or phenolic resins as a binder for asbestos and other materials in brake linings. Also it can be cured, for example, at about 150° C. for about 16 hours to obtain an infusible body. This latter can be pulverized and used as a friction fortifier in brake linings and clutch facings and is identified as product I, cured.

The residue starting materials can be incorporated directly by heat or by heat and an acid or alkaline catalyst into cashew nut shell liquid (CNSL) and its derivatives such as polymerized CNSL, distillates of CNSL such as cardol, distillate residues of CNSL and the polymerized residues of CNSL.

Example J 120 parts of CNSL distillation residue, 40 parts of dehydrated residue starting material identified above, 8 parts of diethyl sulphate and 5 parts of paraformaldehyde are heated together at 100° C. until a viscous intermediate product is formed. This intermediate product, known hereinafter as product J intermediate, can be mixed into asbestos and other fillers in the making of brake linings and clutch facings and can be incorporated into rubber to increase oil resistance. And this intermediate product can be further cured, for example, at about 150° C. for 16 hours to obtain an infusible mass which can be pulverized. The pulverized product, for example, at 20 to 40 mesh, can be used for friction fortifying material in brake linings and clutch facings.

The products E, F, G, H, I and J, singly or in mixtures of two or more may be ground to a fine powder and used as a brake lining binder alone or with hexamethylene tetramine and lime. They may be used with phenol aldehyde resins for further heating to an infusible mass. Each and all of these compounds, including each of the products A to J can be used as friction fortifying material.

Example K 100 parts of residue starting material after dehydration at 125° C., 4 parts of a solution of 1 part of caustic soda in 3 parts of water and 10 parts of sulphur are heated together at about 125° C. to about 150° C. to incorporate the sulphur into the residue starting material.

The soft rubbery gel-like reaction products obtained in Examples B and C above by combining the residue starting materials with "VYNS," can be incorporated into Buna-N (GR–A) polymers, GR–S polymers, neoprene and natural rubber for improving oil resistance and for obtaining a very soft stock which is useful in printing rolls.

The residue starting material and the intermediates of the examples above can be hydrogenated to make variations of the examples above.

Example L 200 parts of the residue starting materials identified above and containing about 16% water were distilled at about 40 millimeters of mercury pressure. Up to 175° C. 45 parts came over as a distillate of which 32 parts were water and 13 parts were an oily liquid heavier than water. Between 175° C. and 240° C. about 75 parts more came over as a distillate, with some cracking at the end. This left a residue which was a solid, pulverizable mass.

A friction fortifying material can be made by placing a quantity of the residue starting material in a kettle having a stirrer and heating up to about 300° C. with stirring until about 50% of the starting material has come out as distillate. The residue will be a hard, friable, infusible material which will be pulverized by the stirrer. This pulverized material can be used as a friction fortifier when added to brake lining and clutch facing mixtures well known in the art, including rubber, asbestos, coal, coke and other materials.

The distillate can be treated as in Examples A to J above to make variations of those examples.

Example M 100 parts of Buna-N (GR–A), 5 parts of zinc oxide, 100 parts of product B (or product C), 5 parts of stearic acid, 1.5 parts sulphur and 1.5 parts Altax (accelerator) are milled together on a rubber mill. This composition can be cured for 30 minutes at about 150° C. to give a soft, resilient compound suitable for making into printing rolls. The Shore hardness is about 37 to 42.

This application is a division of our copending application Serial No. 211,576, filed February 17, 1951, now abandoned.

Having thus described our invention, what we claim is:

1. The method for sulfurizing residue obtained from the furfural extractive distillation method for the purification of butadiene and containing butadient-furfural reaction product comprising heating together said residue and sulfur in the presence of a caustic alkali as a catalyst.

2. The product of the process of claim 1.

3. A novel composition of matter produced by heat combining (A) copolymer of vinyl chloride and vinyl acetate and (B) a sulfurized residue, said sulfurized residue before being sulfurized being obtained as a residue from the furfural extractive distillation method for the purification of butadiene and containing butadiene-furfural reaction product, the quantity of (B) being greater than the quantity of (A).

References Cited in the file of this patent

UNITED STATES PATENTS 2,483,903    Herbolsheimer _____ Oct. 4, 1949